United States Patent
Oshima et al.

(10) Patent No.: US 10,202,160 B2
(45) Date of Patent: Feb. 12, 2019

(54) FRONT FENDER OF SADDLE-TYPE VEHICLE

(71) Applicant: HONDA MOTOR CO., LTD., Tokyo (JP)

(72) Inventors: Hidekazu Oshima, Wako (JP); Takuya Ebihara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 419 days.

(21) Appl. No.: 14/943,759

(22) Filed: Nov. 17, 2015

(65) Prior Publication Data

US 2016/0144921 A1    May 26, 2016

(30) Foreign Application Priority Data

Nov. 25, 2014   (JP) ................... 2014-237589

(51) Int. Cl.
| | |
|---|---|
| B62J 23/00 | (2006.01) |
| B62J 17/02 | (2006.01) |
| B62J 15/00 | (2006.01) |
| B62K 11/04 | (2006.01) |
| B62K 25/08 | (2006.01) |
| B62M 7/04 | (2006.01) |

(52) U.S. Cl.
CPC .............. *B62J 15/00* (2013.01); *B62J 17/02* (2013.01); *B62J 23/00* (2013.01); *B62K 11/04* (2013.01); *B62K 25/08* (2013.01); *B62M 7/04* (2013.01)

(58) Field of Classification Search
CPC ......... B62K 11/00; B62K 11/04; B62K 11/08; B62K 25/08; B62J 15/00; B62J 15/02; B62J 17/02; B62J 23/00

USPC .......................................... 180/219; 293/105
See application file for complete search history.

(56) References Cited

U.S. PATENT DOCUMENTS

| | | | |
|---|---|---|---|
| 4,822,067 A | 4/1989 | Matsuo et al. | |
| 4,982,973 A * | 1/1991 | Saito ...................... | B60K 11/08 180/229 |
| 9,440,697 B1 * | 9/2016 | Yokoyama ............... | B62J 15/00 |
| 2003/0047934 A1 * | 3/2003 | Tsukiji ..................... | B62J 17/02 280/847 |
| 2003/0121708 A1 * | 7/2003 | Laivins .................... | B62J 15/00 180/229 |

(Continued)

FOREIGN PATENT DOCUMENTS

| | | |
|---|---|---|
| EP | 1 923 305 | 5/2008 |
| FR | 2557532 | 7/1985 |

(Continued)

*Primary Examiner* — Joseph M Rocca
*Assistant Examiner* — Daniel S Yeagley
(74) *Attorney, Agent, or Firm* — Rankin, Hill & Clark LLP

(57) ABSTRACT

A front fender that can guide a relative wind to an engine while suppressing increases in the weight and the number of parts. The front fender includes a main body part having a substantially reverse U-shaped section opened downward and step parts extending from left and right end parts of this main body part toward both lateral sides, at least at a part of the front fender on the front side relative to left and right fork tubes. The step parts are formed to extend from a front part of the front fender toward the upper rear side along an upper edge contour line in side view of the front fender and then extend toward the lower rear side at a part near the front side of the fork tubes.

20 Claims, 10 Drawing Sheets

(56) References Cited

U.S. PATENT DOCUMENTS

| | | | |
|---|---|---|---|
| 2006/0000652 A1* | 1/2006 | Yamaguchi | B62J 15/00 180/68.3 |
| 2008/0156291 A1* | 7/2008 | Kitamura | F02M 35/024 123/198 E |
| 2008/0156566 A1* | 7/2008 | Oohashi | B62K 11/04 180/229 |
| 2009/0058066 A1* | 3/2009 | Adachi | B62J 15/02 280/854 |
| 2010/0032225 A1* | 2/2010 | Oohashi | B62K 11/04 180/219 |
| 2013/0118721 A1* | 5/2013 | Inoue | F01P 3/18 165/148 |
| 2013/0118822 A1* | 5/2013 | Toda | B60K 11/04 180/68.4 |
| 2015/0014079 A1* | 1/2015 | Takasaki | B62J 23/00 180/229 |
| 2015/0014080 A1* | 1/2015 | Takasaki | B62J 15/00 180/229 |

FOREIGN PATENT DOCUMENTS

| | | | |
|---|---|---|---|
| JP | 2006-015930 | 1/2006 | |
| WO | WO-2013121597 A1 * | 8/2013 | B62J 15/00 |

* cited by examiner

FRONT FENDER OF SADDLE-TYPE VEHICLE

BACKGROUND OF THE INVENTION

Field of the Invention

The present invention relates to a front fender of a saddle-type vehicle that is shaped to guide a relative wind to an engine and radiators.

Description of Related Art

In the case of a vehicle including a raised front fender and an engine and radiators that are disposed on the rear side of the raised front fender, differently from a lowered front fender, a relative wind flowing on the upper surface of the front fender readily flows upward along a headlight and a front cover (front number plate and so forth) directly and it is important to guide the relative wind to the engine side and the side of the radiators disposed in front of the engine for cooling.

As a related art, a structure is disclosed in which a wind guide path to make the upper surface side and lower surface side of a front fender to communicate with each other is made in order to cause a relative wind flowing on the upper surface of the front fender to efficiently impinge on an engine (for example refer to Japanese Patent Laid-Open No. 2006-15930).

In the structure of Japanese Patent Laid-Open No. 2006-15930, a wind guide orifice of the wind guide path is opened to the lower surface side of the front fender and, thus, the wind guide orifice is readily clogged by mud and so forth thrown up from the front wheel. Accordingly, countermeasures to prevent the clogging by mud and so forth are necessary, which easily causes increases in the weight and the number of parts.

An object of the present invention is to provide a front fender that can guide a relative wind to an engine while suppressing increases in the weight and the number of parts.

SUMMARY OF THE INVENTION

To solve the above-described problem, the present invention provides the following configuration in a saddle-type vehicle including a vehicle body frame including a head pipe and a main frame extending from the head pipe toward a lower rear side, an engine disposed below the main frame, a steering shaft pivotally supported by the head pipe steerably, a bottom bridge attached to a lower end part of the steering shaft, left and right fork tubes that are attached to left and right end parts of the bottom bridge and support a front wheel movably in an upward-downward direction at lower end parts of the fork tubes, and a front fender fixed to the bottom bridge or the fork tubes. The front fender includes a front fender main body part having a substantially reverse U-shaped section opened downward and step parts extending from left and right end parts of the front fender main body part toward both lateral sides, at least at a part of the front fender on a front side relative to the left and right fork tubes. Furthermore, the step parts are formed to extend from a front part of the front fender toward an upper rear side along an upper edge contour line in side view of the front fender and then extend toward a lower rear side at a part near the front side of the fork tubes.

In the above configuration, a height difference between the front fender main body part and the step parts may gradually become larger in a direction from the front side of the front fender toward a rear side of the front fender.

Furthermore, in the above configuration, an angle of rear end parts of the step parts may be set to a substantially right angle or a smaller angle with respect to the fork tubes.

Moreover, in the above configuration, left and right vertical wall parts forming the front fender main body part located inside the step parts in a vehicle width direction may be formed to be located closer to an outside in the vehicle width direction when a position is closer to the rear side than to the front side.

In addition, in the above configuration, step-part vertical wall parts extending downward may be provided at outside edge parts of the step parts in the vehicle width direction.

Furthermore, in the above configuration, the vehicle body frame may include a down-frame extending from the head pipe toward a lower rear side. In addition, radiators may be each provided at a position that is offset to at least one of left and right of the down-frame and is lower than the bottom bridge, and extensions of rear end parts of the step parts may pass through radiator cores of the radiators in side view.

Moreover, in the above configuration, an upper surface of the front fender may be formed to bend in such a manner that a central part in the vehicle width direction protrudes upward.

The front fender of the present invention includes the front fender main body part having the substantially reverse U-shaped section opened downward and the step parts extending from the left and right end parts of the front fender main body part toward both lateral sides, at least at the part of the front fender on the front side relative to the pair of left and right fork tubes. Furthermore, the step parts are formed to extend from the front part of the front fender toward the upper rear side along the upper edge contour line in side view of the front fender and then extend toward the lower rear side at the part near the front side of the fork tubes. Therefore, a relative wind that impinges on left and right parts of the front fender can be made to flow with orientations along the step parts toward the lower rear side. Thus, the relative wind can be made to impinge on the engine disposed on the rear side relative to the step parts and cooling of the engine can be promoted. Because it suffices for the front fender to have the above-described simple shape, increases in the weight and the number of parts of the front fender are not caused.

Furthermore, the height difference between the front fender main body part and the step parts gradually becomes larger in the direction from the front side of the front fender toward the rear side. This facilitates the flowing of the relative wind along the step parts.

Moreover, the angle of the rear end parts of the step parts is set to a substantially right angle or a smaller angle (i.e., less than or equal to 90°) with respect to the fork tubes. Therefore, the relative wind is made to flow from the rear end parts of the step parts toward the vehicle body rear side at the substantially right angle or the smaller angle to the fork tubes. This can facilitate guiding of the relative wind to the engine side.

In addition, the left and right vertical wall parts forming the front fender main body part located inside the step parts in the vehicle width direction are formed to be located closer to the outside in the vehicle width direction when the position is closer to the rear side. This allows the relative wind guided along the step parts to be oriented to flow more outward as the relative wind moves toward the rear side by the vertical wall parts. Thus, the amount of relative wind that impinges on a headlight and the fork tubes and flows upward can be reduced and consequently the amount of wind flowing to the engine side on the lower rear side can be increased.

Furthermore, the step-part vertical wall parts extending downward are provided at the outside edge parts of the step parts in the vehicle width direction. Therefore, the rigidity of the step parts and hence the rigidity of the front fender can be enhanced by the step-part vertical wall parts. In addition, the mud guard performance can be improved.

Moreover, the vehicle body frame includes the down-frame extending from the head pipe toward the lower rear side. In addition, the radiators are each provided at a position that is offset to at least one of the left and right of the down-frame and is lower than the bottom bridge, and the extensions of the rear end parts of the step parts pass through the radiator cores of the radiators in side view. Therefore, the relative wind can be effectively guided to the radiator cores and the performance of cooling the radiators can be improved.

In addition, the upper surface of the front fender is formed to bend such that the central part in the vehicle width direction protrudes upward. Therefore, the relative wind that impinges on the central part of the front fender in the vehicle width direction can be distributed to the left and right sides by the protruding upper surface and then be guided to be oriented toward the lower rear side by the left and right step parts. This can further improve the performance of cooling the engine.

BRIEF DESCRIPTION OF THE DRAWINGS

These and further features of the invention will be apparent with reference to the following description and drawings, wherein.

DETAILED DESCRIPTION OF THE INVENTION

A preferred embodiment of the present invention will be described below with reference to the drawings. In the description, directions such as front, rear, left, right, upward, and downward directions are the same as those with respect to the vehicle body unless particularly stated otherwise. Furthermore, symbol FR shown in the respective drawings indicates the vehicle body front side. In addition, symbol UP indicates the vehicle body upper side and symbol LH indicates the vehicle body left side.

Figure 1:
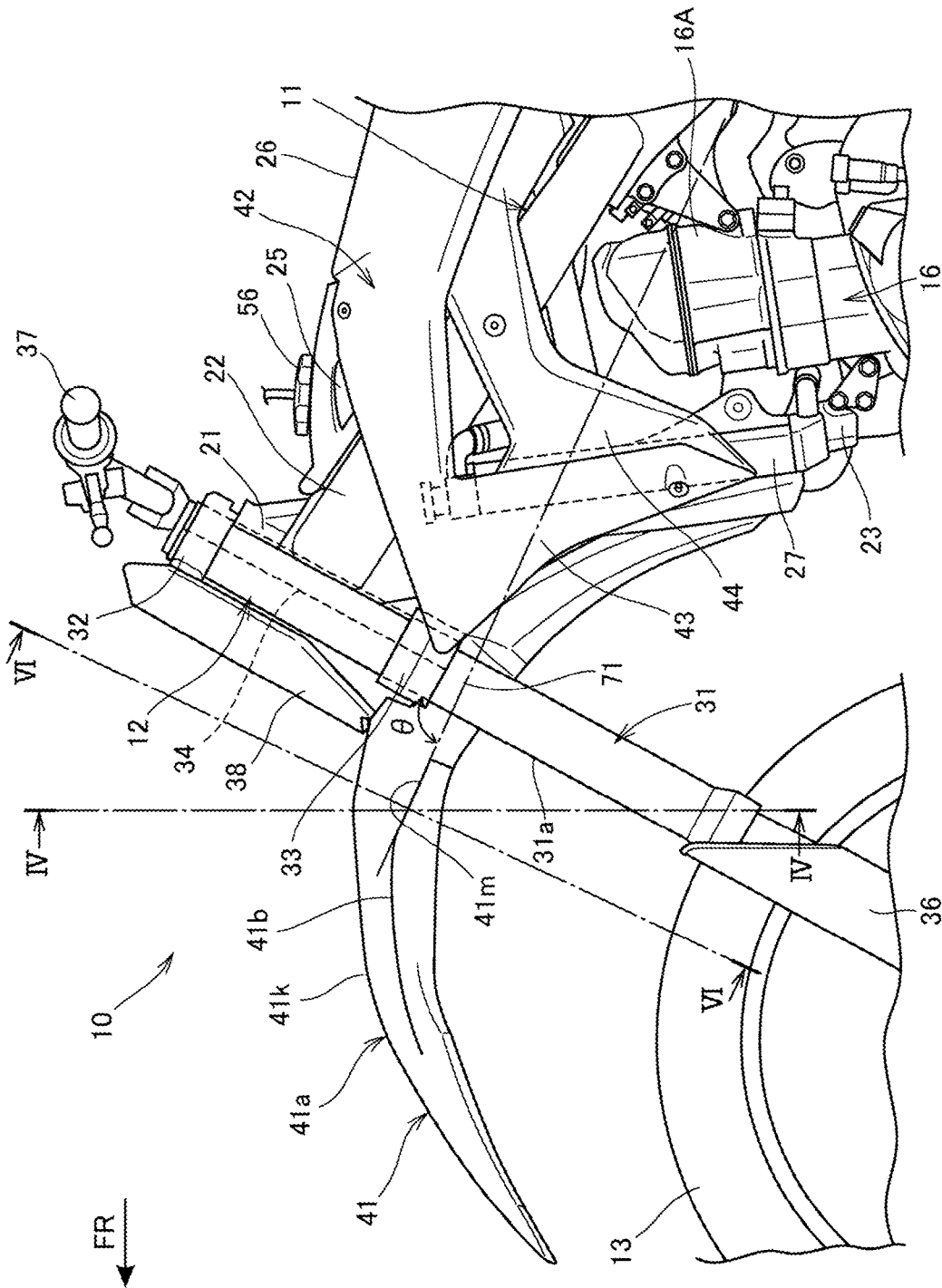
FIG. 1 is a side view of a front part of a motorcycle including a front fender of one embodiment of the present invention.

FIG. 1 is a side view of a front part of a motorcycle 10 including a front fender 41 of the one embodiment of the present invention.

The motorcycle 10 is a saddle-type vehicle in which a front wheel 13 is rotatably supported by a front end part of a vehicle body frame 11 with the intermediary of a front fork 12 and an engine 16 is supported by a lower part of the vehicle body frame 11.

The vehicle body frame 11 includes a head pipe 21 forming the front end part, left and right main frames 22 extending from the head pipe 21 toward the lower rear side obliquely, and a down-frame 23 extending from the head pipe 21 toward the lower rear side obliquely under the main frames 22.

The front fork 12 is steerably supported on the head pipe 21. A fuel tank 25 is fixed to upper parts of the left and right main frames 22. A seat 26 supported by a rear part of the vehicle body frame 11 is disposed on the rear side of the fuel tank 25. The engine 16 is supported on the left and right main frames 22 and the down-frame 23. On the down-frame 23, left and right radiators 27 and 28 disposed on left and right sides of the down-frame 23 (only the left radiator 27 is shown in FIG. 1) are supported.

The front fork 12 includes left and right fork tubes 31, a top bridge 32, a bottom bridge 33, and a steering stem 34.

The fork tubes 31 have a telescopic structure and are composed of a spring that supports the weight and a damper that damps vibrations. Fork guards 36 are attached to lower parts of the fork tubes 31. The top bridge 32 and the bottom bridge 33 couple the left and right fork tubes 31. The top bridge 32 is attached to upper end parts of the left and right fork tubes 31 and the bottom bridge 33 is attached to positions separate downward from the top bridge 32 on the left and right fork tubes 31. A handlebar 37 is attached to an upper part of the top bridge 32.

The steering stem 34 is a steering shaft made to span the centers of the top bridge 32 and the bottom bridge 33 in a vehicle width direction in such a manner as to vertically extend, and is rotatably supported by the head pipe 21.

A number plate 38 on which a number is indicated is attached to the bottom bridge 33 and the handlebar 37.

The front fender 41 covering the front wheel 13 from above is fixed to a lower part of the bottom bridge 33. The front fender 41 is improved in its shape and is formed to facilitate guiding of a relative wind to the engine 16 and the radiators 27 and 28. Symbol 42 in the diagram denotes left and right shrouds that cover part of the main frames 22 and the radiators 27 and 28 from the lateral sides. Each shroud 42 is composed of two parts: an outer shroud 43 and an inner shroud 44, part of which is disposed inside the outer shroud 43.

The engine 16 has a cylinder unit 16A made to stand upright from a crankcase.

Figure 2:
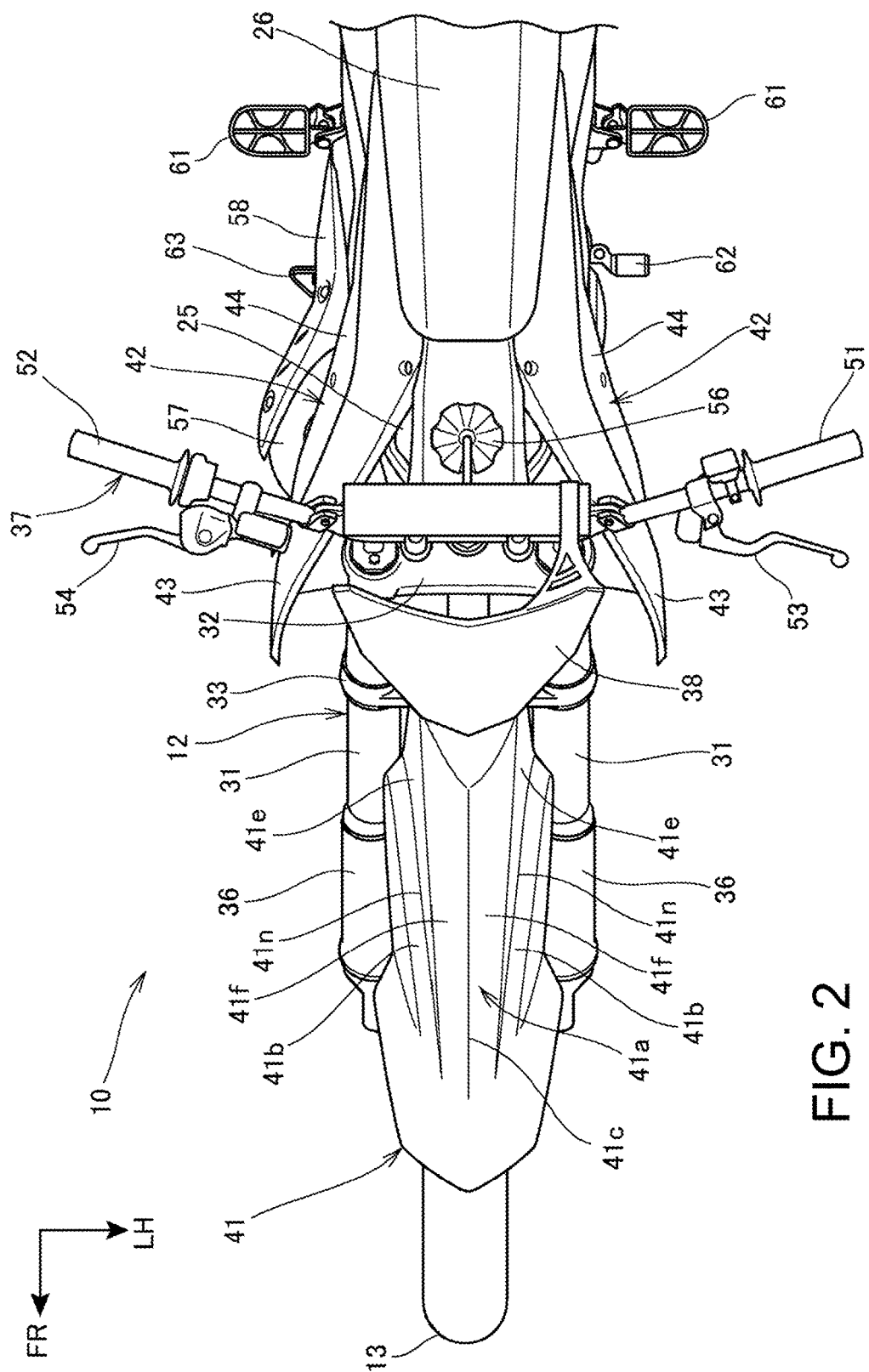
FIG. 2 is a plan view showing the front part of the motorcycle.

FIG. 2 is a plan view showing the front part of the motorcycle 10.

The front fender 41 passes between the left and right fork tubes 31 of the front fork 12 and extends along a front-rear direction. On the left and right of the rear side of the front fender 41, the left and right shrouds 42 that are wide open in a left-right direction on the front side and gradually narrow in the rear direction are disposed. Part of a relative wind whose predetermined flow is formed by the front fender 41 is guided to the inside of the left and right shrouds 42 and is made to impinge on the left and right radiators 27 and 28 (see FIG. 4).

In the drawing, symbols 51 and 52 denote grips provided on both end parts of the handlebar 37. Symbol 53 denotes a clutch lever provided on the left side of the handlebar 37. Symbol 54 denotes a front brake lever provided on the right side of the handlebar 37. Symbol 56 denotes a cap that seals an oil filler port of the fuel tank 25. Symbol 57 denotes an exhaust pipe extending from a front part of the engine 16. Symbol 58 denotes a heat barrier cover that covers the exhaust pipe 57 from a lateral side. Symbols 61 denote steps for the driver. Symbol 62 denotes a gear change pedal and symbol 63 denotes a rear brake pedal.

Figure 3:
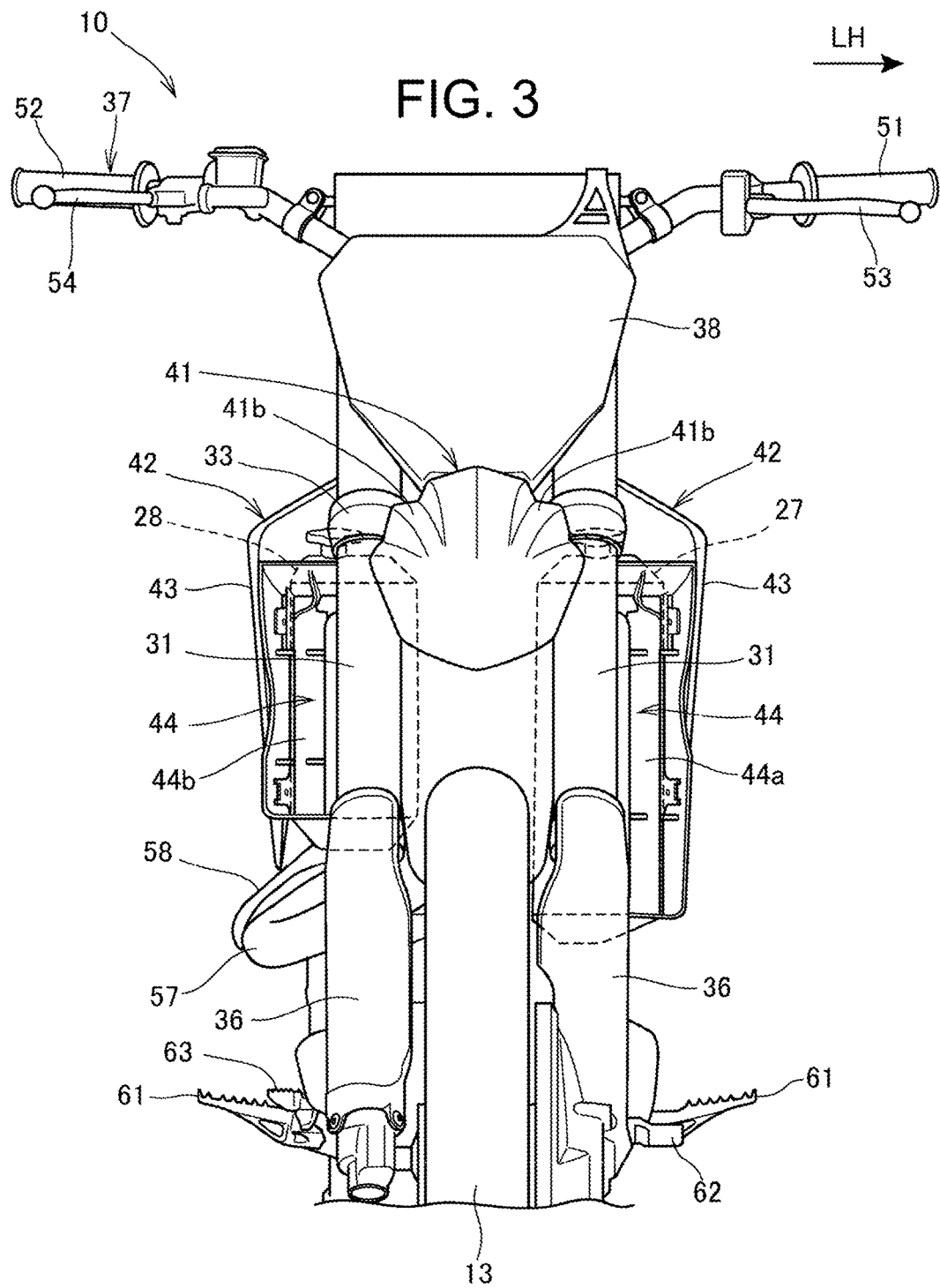
FIG. 3 is a front view showing the motorcycle.

FIG. 3 is a front view showing the motorcycle 10.

An upper part of the front fender 41 (part located on the front side relative to the left and right fork tubes 31) overlaps with the bottom bridge 33, upper parts of the radiators 27 and 28, a lower end part of the number plate 38, and the left and right fork tubes 31 in front view.

Left and right louver parts 44a and 44b made in the left and right inner shrouds 44 are disposed on the front side of the left and right radiators 27 and 28. A relative wind passes through the louver parts 44a and 44b from the vehicle front side and flows to the radiators 27 and 28.

A lower end part of the right radiator 28 is disposed on the upper side relative to a lower end part of the left radiator 27 in order to avoid interference with the exhaust pipe 57, which protrudes toward the right side. Thus, the right radiator 28 is formed with a shorter size in a height direction than the left radiator 27. In association with this, also in the left and right louver parts 44a and 44b of the inner shrouds 44, the height size of the right louver part 44b is smaller than the left louver part 44a.

Figure 4:
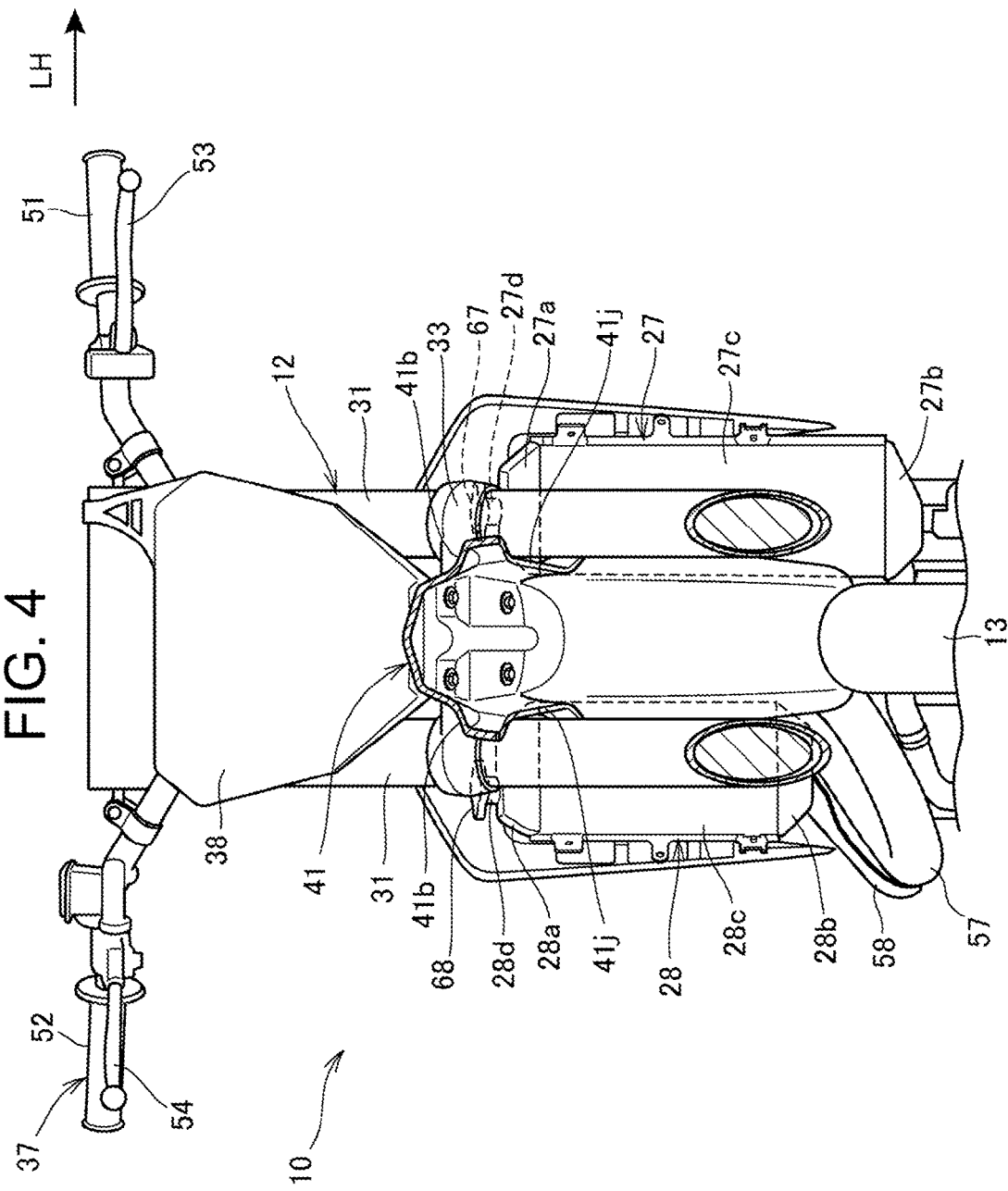
FIG. 4 is a sectional view along line IV-IV in FIG. 1.
Figure 5:
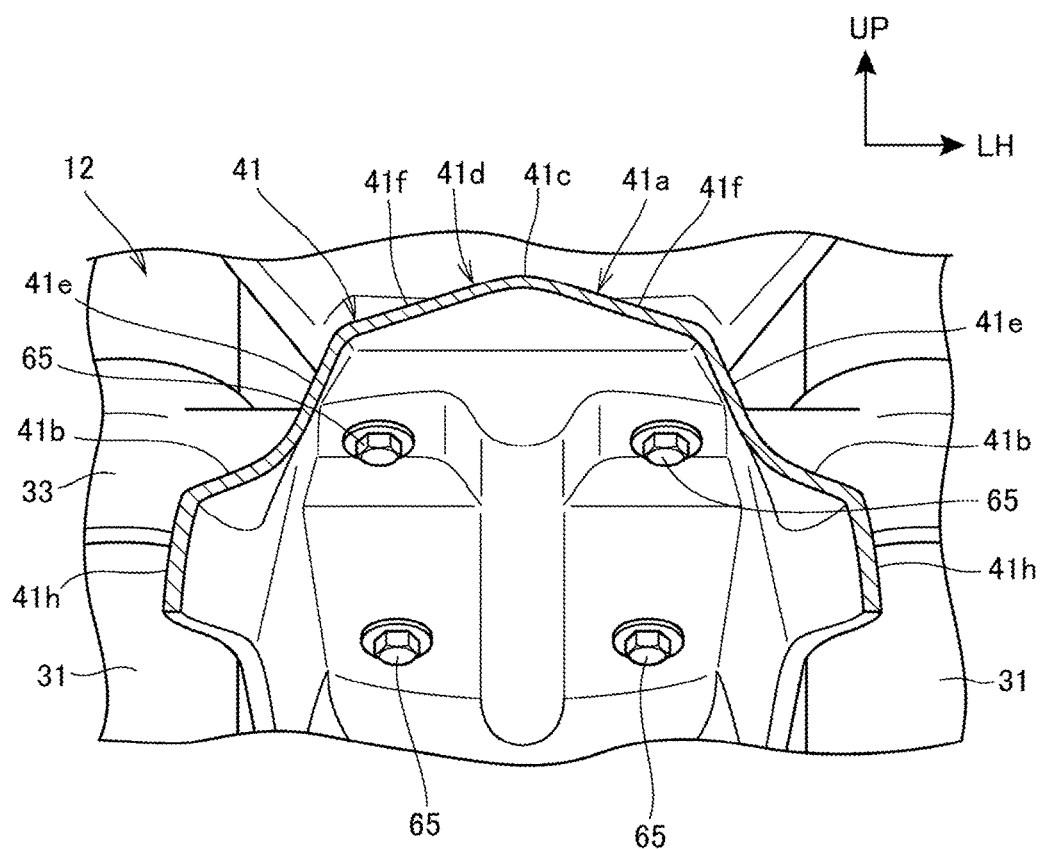
FIG. 5 is an enlarged view around a section of the front fender in FIG. 4.

FIG. 4 is a sectional view along line IV-IV in FIG. 1 and is a diagram obtained by cutting along an upward-downward direction by a plane passing through the highest part of the front fender 41. FIG. 5 is an enlarged view around the section of the front fender 41 in FIG. 4.

As shown in FIGS. 4 and 5, the front fender 41 includes a main body part 41a having a substantially reverse U-shaped section opened downward, left and right step parts 41b extending laterally from left and right end parts of the main body part 41a monolithically, and lower vertical wall parts 41h extending substantially downward from side edges of the step parts 41b monolithically. The front fender 41 is fixed to the lower part of the bottom bridge 33 by plural bolts 65.

The main body part 41a is composed of a mountain-shaped part 41d that has a ridge line 41c as a top part at the center in the vehicle width direction and bends into a mountain shape to protrude upward, and upper vertical wall parts 41e extending monolithically from both edges of the mountain-shaped part 41d toward the lower lateral sides obliquely.

The mountain-shaped part 41d is formed of left-right inclined parts 41f extending from the ridge line 41c toward the lower lateral sides obliquely.

The step part 41b and the upper vertical wall part 41e form a groove whose section has a substantially L-shape and form a wind guide path that guides a relative wind into a predetermined direction (direction toward the radiators 27 and 28 and the engine 16). Furthermore, the left-right inclined parts 41f play a role in distributing the relative wind to the sides of the left and right step parts 41b. The lower vertical wall parts 41h serve as reinforcing parts that enhance the rigidity of the step parts 41b and hence the front fender 41 and enhance the mud guard performance to prevent mud and so forth splashed up by the front wheel 13 (see FIG. 1) from flying to the rider side.

In the front fender 41, left and right fork clearance parts 41j that are located between the left and right fork tubes 31 and are close to these fork tubes 31 are formed.

Substantially inside halves of the left and right radiators 27 and 28 in the vehicle width direction are disposed on the rear side of the left and right fork tubes 31 and substantially outside halves in the vehicle width direction are oriented toward substantially the front side without being blocked by the fork tubes 31.

The radiator 27 is composed of an upper tank 27a provided at an upper end part, a lower tank 27b provided at a lower end part, and a radiator core 27c disposed between the upper tank 27a and the lower tank 27b, and has, in the upper tank 27a, a water filler port 27d and a radiator cap 67 that seals the water filler port 27d.

Similarly, the radiator 28 is composed of an upper tank 28a provided at an upper end part, a lower tank 28b provided at a lower end part, and a radiator core 28c disposed between the upper tank 28a and the lower tank 28b, and has, in the upper tank 28a, a water filler port 28d and a radiator cap 68 that seals the water filler port 28d.

The upper tank 27a, the lower tank 27b, the upper tank 28a, and the lower tank 28b are parts in which coolant is temporarily stored. The radiator cores 27c and 28c are heat dissipating parts that connect the upper tank 27a and the lower tank 27b and connect the upper tank 28a and the lower tank 28b, respectively, by plural conduits through which the coolant passes and are provided with fins between the respective conduits.

The main body parts of the radiators 27 and 28, i.e. the parts excluding the water filler ports 27d and 28d and the radiator caps 67 and 68, are disposed on the lower side relative to the bottom bridge 33.

By the main body part 41a and the step parts 41b of the above-described front fender 41, a predetermined flow can be formed in a relative wind flowing close to the surface of the front fender 41 and the relative wind can be made to flow toward the radiators 27 and 28 and the engine 16 (see FIG. 1).

Referring back to FIG. 1, the step part 41b of the front fender 41 is formed to extend toward the upper rear side obliquely along an upper edge contour line 41k that is an upper edge line of the front fender 41 in side view and extend toward the lower rear side obliquely at a position close to the front side of the fork tubes 31.

Specifically, at a rear end part of the step part 41b, a rear inclined part 41m is formed to extend in a straight line manner toward the lower rear side obliquely in side view. An extension 71 of the rear inclined part 41m is inclined to a front surface 31a of the fork tube 31 by an angle θ. The angle θ is about 90° and the extension 71 passes through the radiators 27 and 28 (see FIG. 4 regarding the radiator 28) and the cylinder unit 16A of the engine 16 in side view. It is preferable that the angle θ is equal to or smaller than 90° and at least the angle θ equal to or smaller than 100° is favorable.

By providing the step parts 41b in this manner, a relative wind that impinges on left and right side parts of the front fender 41 can be made to flow with oblique orientations along the step parts 41b toward the lower rear side. Furthermore, the height difference between the upper edge contour line 41k and the step parts 41b gradually becomes larger in the direction from a front part of the front fender 41 toward the rear side. Because the height difference gradually changes in this manner, the flowing of the relative wind along the step parts 41b can be facilitated.

Furthermore, in FIG. 2, in the front fender 41, the upper vertical wall parts 41e (or valley lines 41n each passing through the boundary between the upper vertical wall part 41e and the step part 41b) are formed to be located closer to the outside in the vehicle width direction when the position is closer to the rear side. This allows the relative wind flowing along the upper vertical wall part 41e and the step part 41b to be oriented to flow more outward as the relative wind moves toward the rear side.

Figure 6:
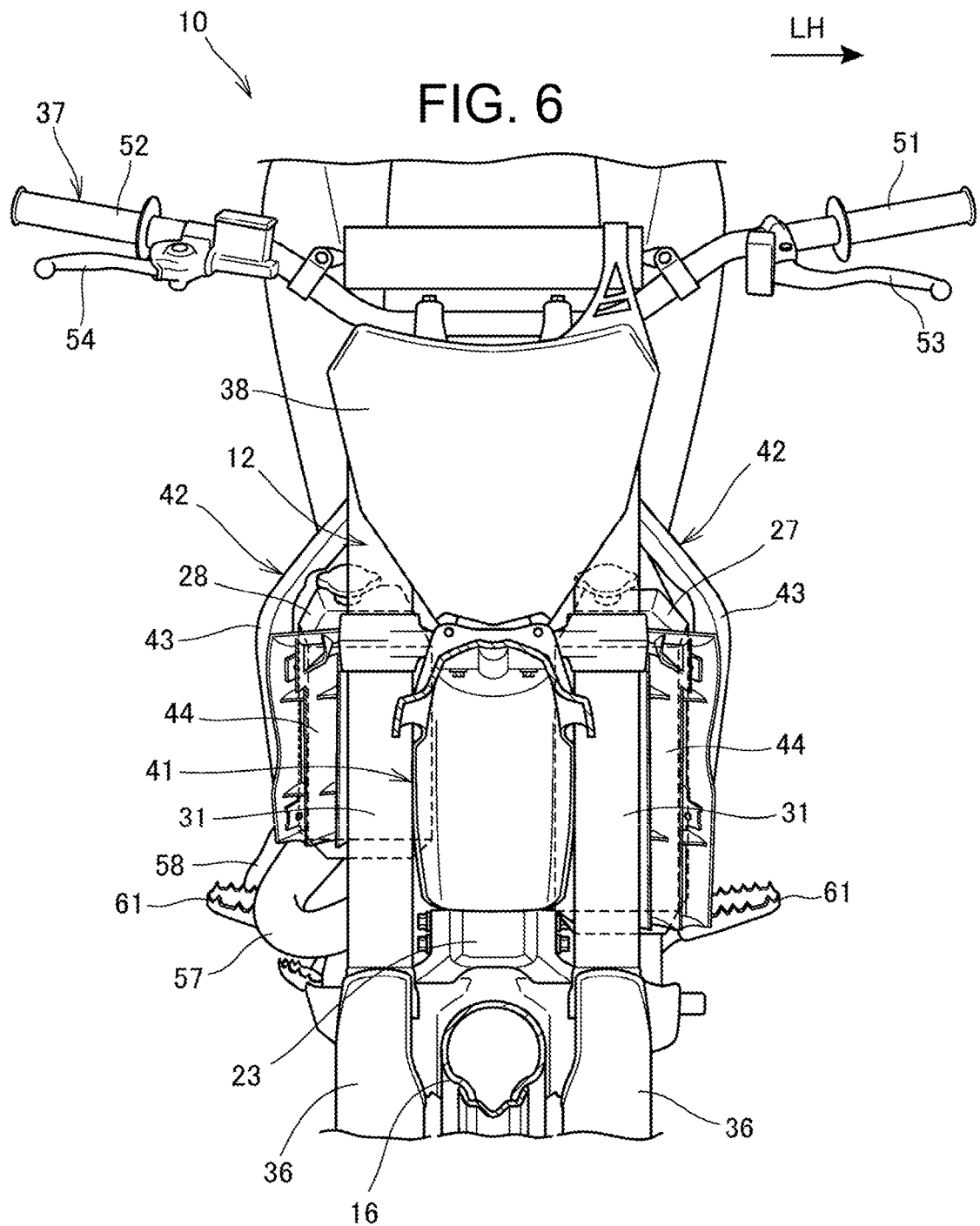
FIG. 6 is a sectional view along line VI-VI in FIG. 1.
Figure 7:
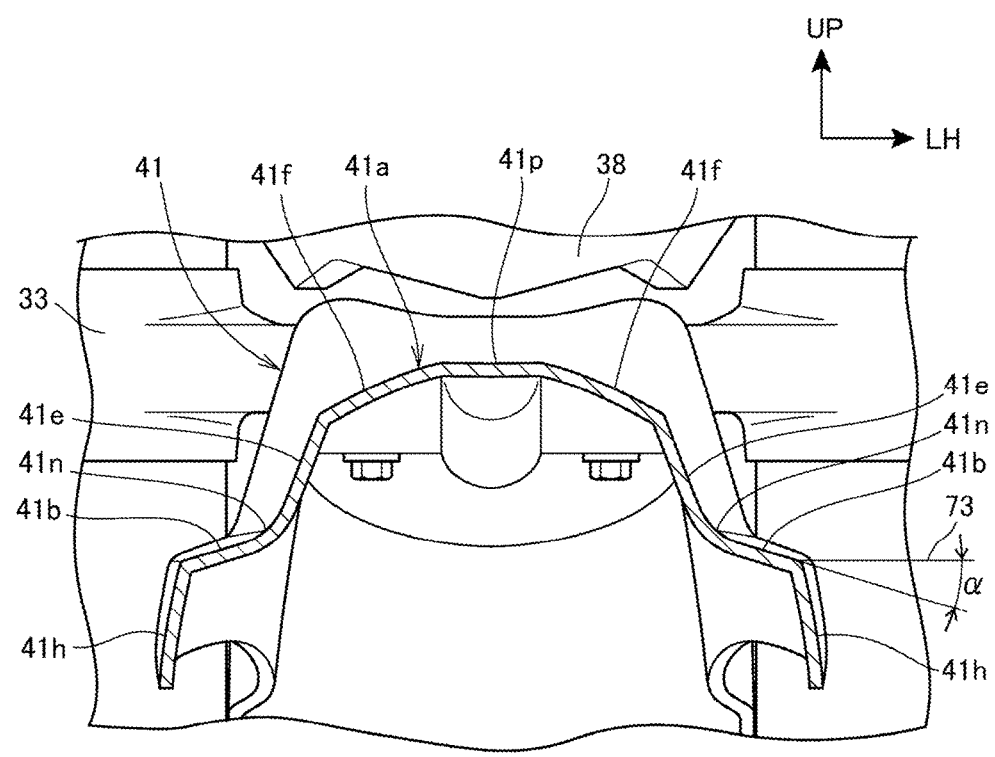
FIG. 7 is an enlarged view around a section of the front fender in FIG. 6.

FIG. 6 is a sectional view along line VI-VI in FIG. 1 and is a diagram showing a section along the inclination of the fork tubes 31. FIG. 7 is an enlarged view around the section of the front fender 41 in FIG. 6.

As shown in FIGS. 6 and 7, in the front fender 41, a flat part 41p that couples inside parts, in the vehicle width direction, of the left-right inclined parts 41f on both sides is formed in the main body part 41a.

The step parts 41b are inclined to a horizontal line 73 by an angle α so that the outside thereof in the vehicle width direction may be lower than the inside in the vehicle width direction. The angle α is e.g. 0 to 20° and preferably 0 to 15°.

The left and right step parts 41b extend toward the left and right fork tubes 31, respectively.

Wind guide operation by the above-described front fender 41 will be described with FIGS. 8 to 10.

Figure 8:
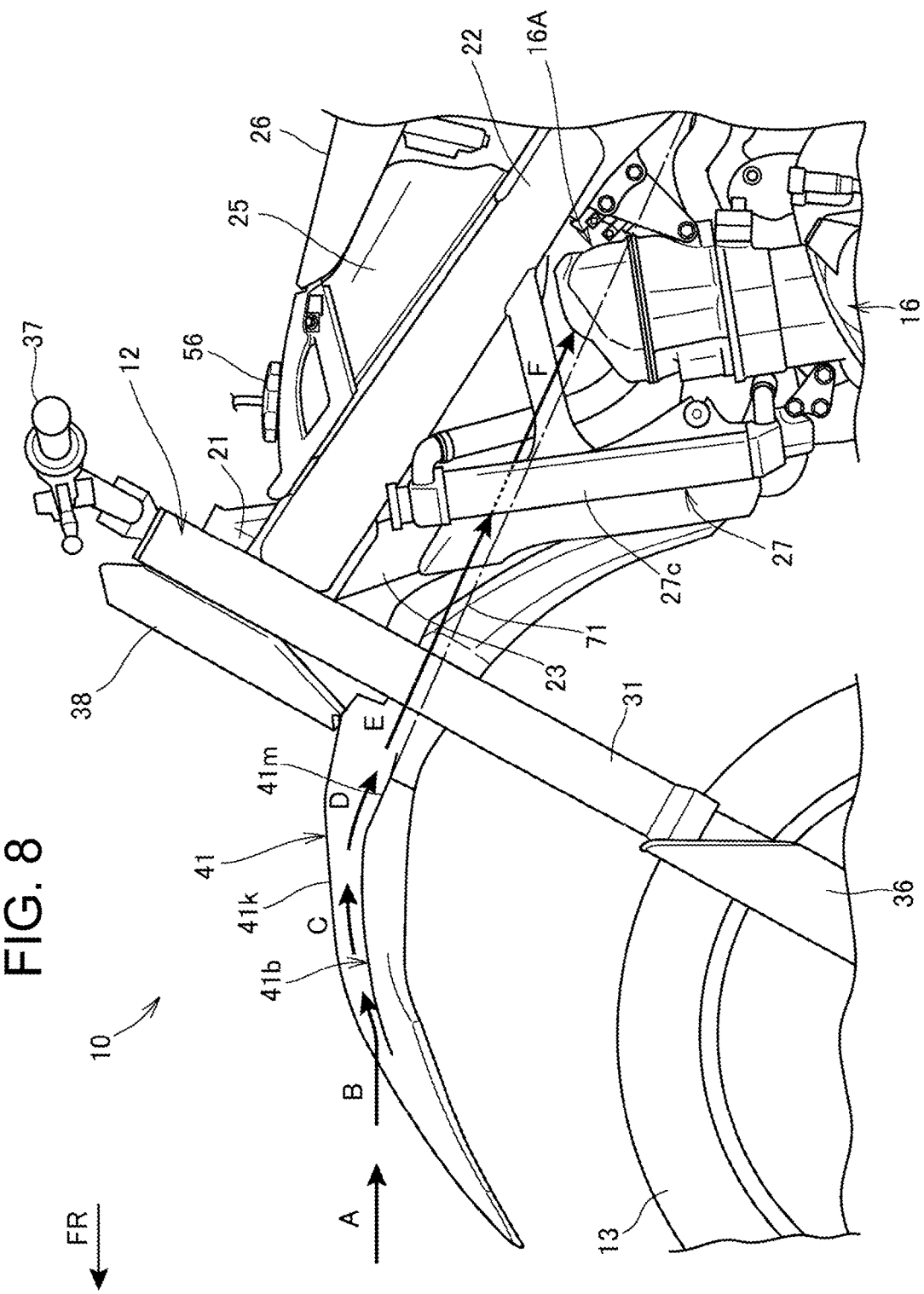
FIG. 8 is a side view showing wind guide operation of the front fender.

FIG. 8 is a side view showing the wind guide operation of the front fender 41. FIG. 9 is a plan view showing the wind guide operation of the front fender 41. FIG. 10 is a perspective view showing the wind guide operation of the front fender 41.

As shown in FIG. 8, on the left side of the front fender 41, a relative wind moving from the vehicle front side toward the motorcycle 10 travels as shown by an arrow A and impinges on the front side of the step part 41b of the front fender 41 to begin to travel along the step part 41b as shown by an arrow B. Thereafter, the relative wind travels along the step part 41b toward the upper rear side obliquely as shown by an arrow C and then travels toward the lower rear side obliquely along the rear inclined part 41m of the rear end part of the step part 41b as shown by an arrow D. Thereafter, as shown by an arrow E, the relative wind travels along the extension 71 of the rear inclined part 41m toward the lower rear side obliquely in a substantially straight line manner while moving around the fork tube 31 of the front fork 12. Then, the relative wind passes through the radiator core 27c of the radiator 27 and impinges on the cylinder unit 16A of the engine 16 as shown by an arrow F. As a result, the radiator 27 and the engine 16 are cooled. Also on the right side of the front fender 41, similarly the relative wind passes through the radiator 28 (see FIG. 4) and impinges on the cylinder unit 16A of the engine 16, so that the radiator 28 and the engine 16 are cooled.

Figure 9:
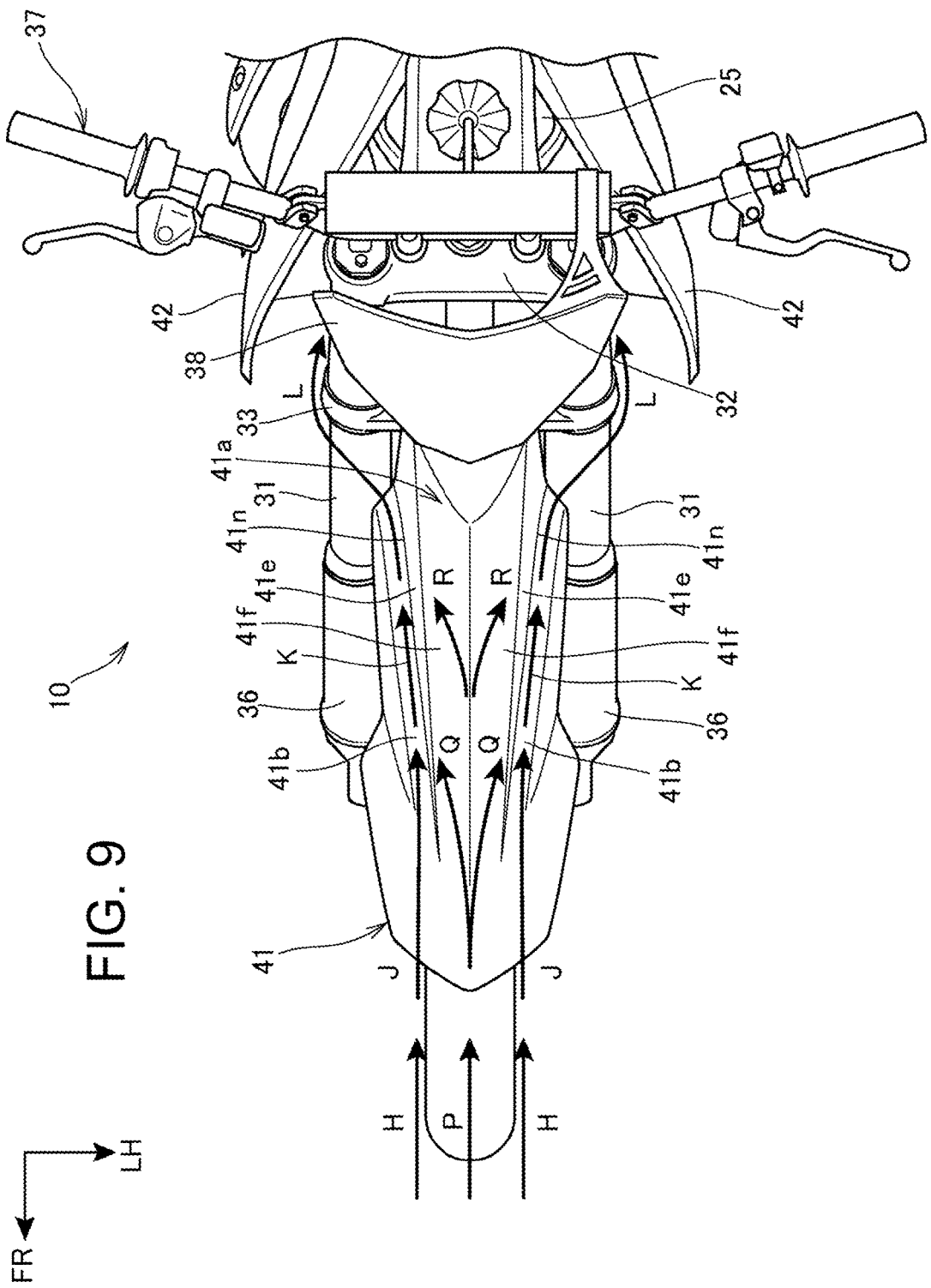
FIG. 9 is a plan view showing the wind guide operation of the front fender; and, FIG. 10 is a perspective view showing the wind guide operation of the front fender.

As shown in FIG. 9, a relative wind moving from the vehicle front side toward the motorcycle 10 travels as shown by arrows H and reaches the left and right step parts 41b of the front fender 41 as shown by arrows J to travel along the step parts 41b and the upper vertical wall parts 41e as shown by arrows K. Then, as shown by arrows L, the relative wind moves around the left and right fork tubes 31 from over the step parts 41b and reaches the radiators 27 and 28 (see FIG. 4) in the left and right shrouds 42. After passing through the radiators 27 and 28, the relative wind flows to the side of the engine 16 (see FIG. 8). The radiators 27 and 28 and the engine 16 are thereby cooled.

Figure 10:
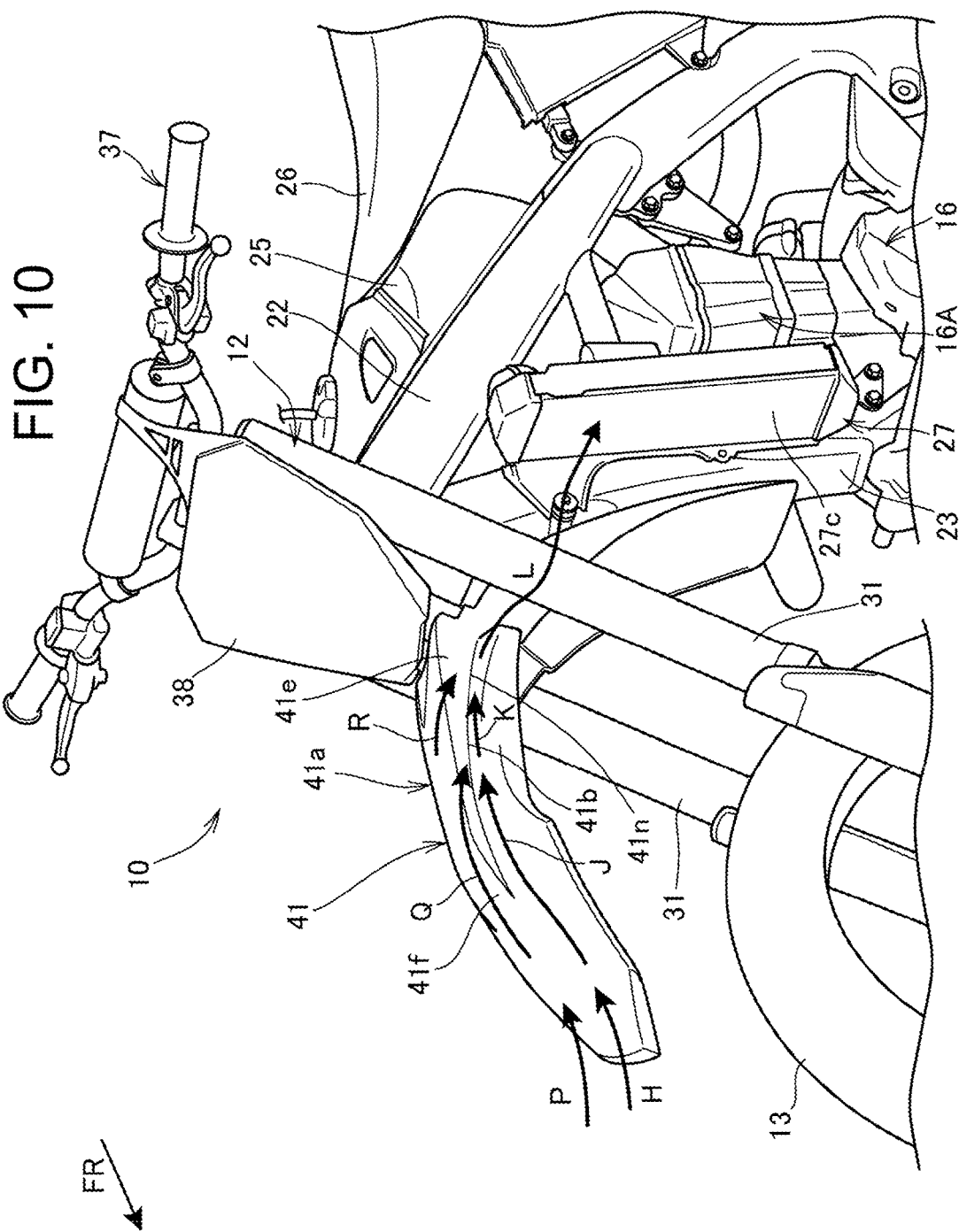

As shown in FIGS. 9 and 10, a relative wind moving from the vehicle front side toward the motorcycle 10 as shown by an arrow P impinges on the left-right inclined parts 41f (in FIG. 10, only the left left-right inclined part 41f is shown) of the main body part 41a of the front fender 41 and is distributed to the left and right sides to reach the step parts 41b from the left-right inclined parts 41f as shown by arrows Q and R. Then, as shown by arrows K and L, the relative wind travels rearward along the step parts 41b and moves around the fork tubes 31 from rear parts of the step parts 41b to reach the radiators 27 and 28 and the engine 16.

As above, the upper vertical wall parts 41e and the step parts 41b of the front fender 41 cooperate with each other. In addition, with a simple shape, the relative wind can be made to head for the radiators 27 and 28 (see FIG. 4 regarding the radiator 28) and the engine 16.

As shown in the above-described FIGS. 1, 4, and 5, in the motorcycle 10 as the saddle-type vehicle including the vehicle body frame 11 including the head pipe 21 and the main frames 22 extending from the head pipe 21 toward the lower rear side, the engine 16 disposed below the main frames 22, the steering stem 34 as the steering shaft pivotally supported by the head pipe 21 steerably, the bottom bridge 33 attached to a lower end part of this steering stem 34, the pair of left and right fork tubes 31 that are attached to left and right end parts of this bottom bridge 33 and support the front wheel 13 movably in the upward-downward direction at lower end parts thereof, and the front fender 41 fixed to the bottom bridge 33 or the fork tubes 31, the front fender 41 includes the main body part 41a as a front fender main body part having a substantially reverse U-shaped section opened downward and the step parts 41b extending from the left and right end parts of this main body part 41a toward both lateral sides, at least at the part of the front fender 41 on the front side relative to the pair of left and right fork tubes 31. The step parts 41b are formed to extend from the front part of the front fender 41 toward the upper rear side along the upper edge contour line 41k in side view of the front fender 41 and then extend toward the lower rear side at a part near the front side of the fork tubes 31.

According to this configuration, a relative wind that impinges on left and right parts of the front fender 41 can be made to flow with orientations along the step parts 41b toward the lower rear side. Thus, the relative wind can be made to impinge on the engine 16 disposed on the rear side relative to the step parts 41b and cooling of the engine 16 can be promoted. Because it suffices for the front fender 41 to have the above-described simple shape, increases in the weight and the number of parts of the front fender 41 are not caused. Therefore, weight reduction and cost reduction can be achieved.

Furthermore, the height difference between the main body part 41a and the step parts 41b gradually becomes larger in the direction from the front side of the front fender 41 toward the rear side. Therefore, the flowing of the relative wind along the step parts 41b can be facilitated.

Moreover, the angle θ of the rear end parts (rear inclined parts 41m) of the step parts 41b is set to a substantially right angle or a smaller angle with respect to the fork tubes 31. Therefore, the relative wind is made to flow from the rear end parts of the step parts 41b toward the vehicle body rear side at the substantially right angle or the smaller angle to the fork tubes 31. This can facilitate guiding of the relative wind to the side of the engine 16.

In addition, as shown in FIG. 2, the upper vertical wall parts 41e as left and right vertical wall parts forming the main body part 41a located inside the step parts 41b in the vehicle width direction are formed to be located closer to the outside in the vehicle width direction when the position is closer to the rear side. This allows the relative wind guided along the step parts 41b to be oriented to flow more outward as the relative wind moves toward the rear side by the upper vertical wall parts 41e. Thus, the amount of relative wind that impinges on a headlight and the fork tubes 31 and flows upward can be reduced and consequently the amount of wind flowing to the side of the engine 16 on the lower rear side can be increased.

Furthermore, as shown in FIG. 5, the lower vertical wall parts 41h as step-part vertical wall parts extending downward are provided at outside edge parts of the step parts 41b in the vehicle width direction. Therefore, the rigidity of the step parts 41b and hence the rigidity of the front fender 41 can be enhanced by the lower vertical wall parts 41h. In addition, the mud guard performance can be improved.

Moreover, as shown in FIGS. 4, 8, and 10, the vehicle body frame 11 includes the down-frame 23 extending from the head pipe 21 toward the lower rear side. In addition, the radiators 27 and 28 are each provided at a position that is offset to at least one of the left and right of the down-frame 23 and is lower than the bottom bridge 33, and the extensions 71 of the rear inclined parts 41m as the rear end parts of the step parts 41b pass through the radiator cores 27c and 28c of the radiators 27 and 28 in side view. Therefore, the relative wind can be effectively guided to the radiator cores 27c and 28c and the performance of cooling the radiators 27 and 28 can be improved.

In addition, as shown in FIG. 5, the upper surface of the front fender 41 is formed to bend in such a manner that the central part in the vehicle width direction protrudes upward. Therefore, the relative wind that impinges on the central part of the front fender 41 in the vehicle width direction can be distributed to the left and right sides by the protruding upper surface (left and right left-right inclined parts 41f) and then be guided to be oriented toward the lower rear side by the left and right step parts 41b. This can further improve the performance of cooling the engine 16.

The above-described embodiment shows one aspect of the present invention definitely and modifications and applications can be arbitrarily made without departing from the gist of the present invention.

For example, in the above embodiment, as shown in FIGS. 4 and 5, the front fender 41 is fixed to the lower part of the bottom bridge 33. However, the configuration is not limited thereto and the front fender may be fixed to at least one of the bottom bridge 33 and the left and right fork tubes 31. Furthermore, although a water-cooled engine is employed, an air-cooled engine may be employed.

The present invention is not limited to the case of application to the motorcycle 10 and can be applied also to saddle-type vehicles also including vehicles other than the motorcycle 10. The saddle-type vehicles include overall vehicles a rider rides astride the vehicle body and are vehicles including not only motorcycles (including motorized bicycles) but also three-wheeled vehicles and four-wheeled vehicles categorized as ATV (rough terrain vehicles).

DESCRIPTION OF REFERENCE SYMBOLS

10 Motorcycle (saddle-type vehicle)
11 Vehicle body frame
13 Front wheel
16 Engine
21 Head pipe
22 Main frame
23 Down-frame
27, 28 Radiator
27c Radiator core
28c Radiator core
31 Fork tube
33 Bottom bridge
34 Steering stem (steering shaft)
41 Front fender
41a Main body part (front fender main body part)
41b Step part
41e Upper vertical wall part (vertical wall part)
41h Lower vertical wall part (step-part vertical wall part)
41k Upper edge contour line
41m Rear inclined part (rear end part of step part)
71 Extension

What is claimed is:

1. A front fender of a saddle-type vehicle including a vehicle body frame including a head pipe and a main frame extending from the head pipe toward a lower rear side of the vehicle body frame, an engine disposed below the main frame, a steering shaft pivotally supported by the head pipe steerably, a bottom bridge attached to a lower end part of the steering shaft, left and right fork tubes that are attached to left and right end parts of the bottom bridge and support a front wheel movably in an upward-downward direction at lower end parts of the fork tubes, and the front fender fixed to the bottom bridge or the fork tubes, wherein
    a front part of the front fender includes a front fender main body part having a substantially reverse U-shaped section opened downward and step parts extending from left and right end parts of the front fender main body part toward both lateral sides of the front fender, the front part of the front fender located on a front side of the left and right fork tubes, and
    the step parts are formed to extend from a front side of the front part of the front fender toward an upper rear side of a rear side of the front part of the front fender along an upper edge contour line in side view of the front fender and then extend toward a lower rear side of the rear side of the front part near the front side of the fork tubes,
    wherein at a rear end part of each step part, a rear inclined part is formed to extend in a straight line manner toward the lower rear side of the vehicle body frame obliquely in side view.

2. The front fender of the saddle-type vehicle according to claim 1, wherein a height difference between the front fender main body part and the step parts gradually becomes larger in a direction from the front side of the front part of the front fender toward the rear side of the front part of the front fender.

3. The front fender of the saddle-type vehicle according to claim 2, wherein an angle of the rear end parts of the step parts with respect to the fork tubes is set to be equal to or less than 90°.

4. The front fender of the saddle-type vehicle according to claim 2, wherein left and right vertical wall parts forming the front fender main body part located inside the step parts in a vehicle width direction are formed to be located closer to an outside in the vehicle width direction when a position is closer to the rear side of the front part of the front fender than to the front side of the front part of the front fender.

5. The front fender of the saddle-type vehicle according to claim 2, wherein step-part vertical wall parts extending downward are provided at outside edge parts of the step parts in a vehicle width direction.

6. The front fender of the saddle-type vehicle according to claim 2, wherein the vehicle body frame includes a down-frame extending from the head pipe toward the lower rear side of the vehicle body frame, and radiators are each provided at a position that is offset to at least one of left and right sides of the down-frame and is lower than the bottom bridge, and imaginary extension lines of the rear inclined parts that extend in the straight line manner pass through radiator cores of the radiators.

7. The front fender of the saddle-type vehicle according to claim 2, wherein an upper surface of the front fender main body part is formed to bend in such a manner to define a mountain-shaped part that has a ridge line as a top part on a central part in a vehicle width direction protrudes upward, and upper vertical wall parts of the main body part extend monolithically from both edges of the mountain-shaped part toward lower lateral sides of the main body part obliquely.

8. The front fender of the saddle-type vehicle according to claim 1, wherein an angle of the rear end parts of the step parts with respect to the fork tubes is set to be equal to or less than 90°.

9. The front fender of the saddle-type vehicle according to claim 8, wherein left and right vertical wall parts forming the front fender main body part located inside the step parts in a vehicle width direction are formed to be located closer to an outside in the vehicle width direction when a position is closer to the rear side of the front part of the front fender than to the front side of the front part of the front fender.

10. The front fender of the saddle-type vehicle according to claim 8, wherein step-part vertical wall parts extending downward are provided at outside edge parts of the step parts in the vehicle width direction.

11. The front fender of the saddle-type vehicle according to claim 8, wherein the vehicle body frame includes a down-frame extending from the head pipe toward the lower rear side of the vehicle body frame, and radiators are each provided at a position that is offset to at least one of left and right sides of the down-frame and is lower than the bottom bridge, and imaginary extension lines of the rear inclined parts that extend in the straight line manner pass through radiator cores of the radiators.

12. The front fender of the saddle-type vehicle according to claim 8, wherein an upper surface of the front fender main body part is formed to bend in such a manner to define a mountain-shaped part that has a ridge line as a top part on a central part in a vehicle width direction protrudes upward, and upper vertical wall parts of the main body part extend monolithically from both edges of the mountain-shaped part toward lower lateral sides of the main body part obliquely.

13. The front fender of the saddle-type vehicle according to claim 1, wherein left and right vertical wall parts forming the front fender main body part located inside the step parts in a vehicle width direction are formed to be located closer to an outside in the vehicle width direction when a position is closer to the rear side of the front part of the front fender than to the front side of the front part of the front fender.

14. The front fender of the saddle-type vehicle according to claim 13, wherein step-part vertical wall parts extending downward are provided at outside edge parts of the step parts in the vehicle width direction.

15. The front fender of the saddle-type vehicle according to claim 13, wherein the vehicle body frame includes a down-frame extending from the head pipe toward the lower rear side of the vehicle body frame, and radiators are each provided at a position that is offset to at least one of left and right sides of the down-frame and is lower than the bottom bridge, and imaginary extension lines of the rear inclined parts that extend in the straight line manner pass through radiator cores of the radiators.

16. The front fender of the saddle-type vehicle according to claim 13, wherein an upper surface of the front fender main body part is formed to bend in such a manner to define a mountain-shaped part that has a ridge line as a top part on a central part in the vehicle width direction protrudes upward, and upper vertical wall parts of the main body part extend monolithically from both edges of the mountain-shaped part toward lower lateral sides of the main body part obliquely.

17. The front fender of the saddle-type vehicle according to claim 1, wherein step-part vertical wall parts extending downward are provided at outside edge parts of the step parts in a vehicle width direction.

18. The front fender of the saddle-type vehicle according to claim 17, wherein the vehicle body frame includes a down-frame extending from the head pipe toward the lower rear side of the vehicle body frame, and radiators are each provided at a position that is offset to at least one of left and right sides of the down-frame and is lower than the bottom bridge, and imaginary extension lines of the rear inclined parts that extend in the straight line manner pass through radiator cores of the radiators.

19. The front fender of the saddle-type vehicle according to claim 1, wherein the vehicle body frame includes a down-frame extending from the head pipe toward the lower rear side of the vehicle body frame, and radiators are each provided at a position that is offset to at least one of left and right sides of the down-frame and is lower than the bottom bridge, and imaginary extension lines of the rear inclined parts that extend in the straight line manner pass through radiator cores of the radiators.

20. The front fender of the saddle-type vehicle according to claim 1, wherein an upper surface of the front fender main body part is formed to bend in such a manner to define a mountain-shaped part that has a ridge line as a top part on a central part in a vehicle width direction protrudes upward, and upper vertical wall parts of the main body part extend monolithically from both edges of the mountain-shaped part toward lower lateral sides of the main body part obliquely.

* * * * *